(No Model.)
H. HOULDSWORTH.
DETACHABLE BUSH FOR WHEELBARROW AXLES.
No. 596,708. Patented Jan. 4, 1898.
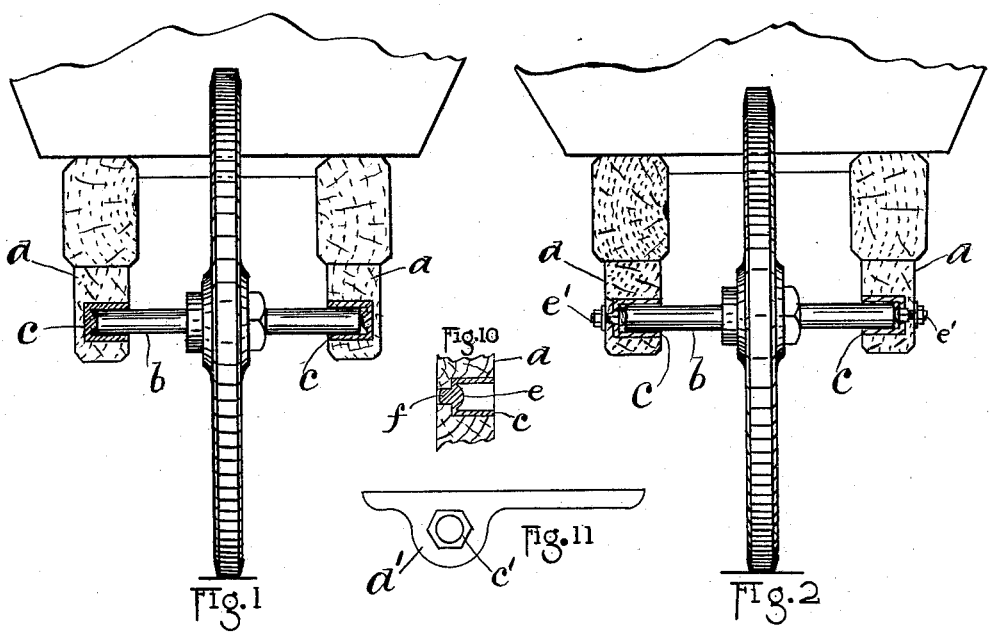
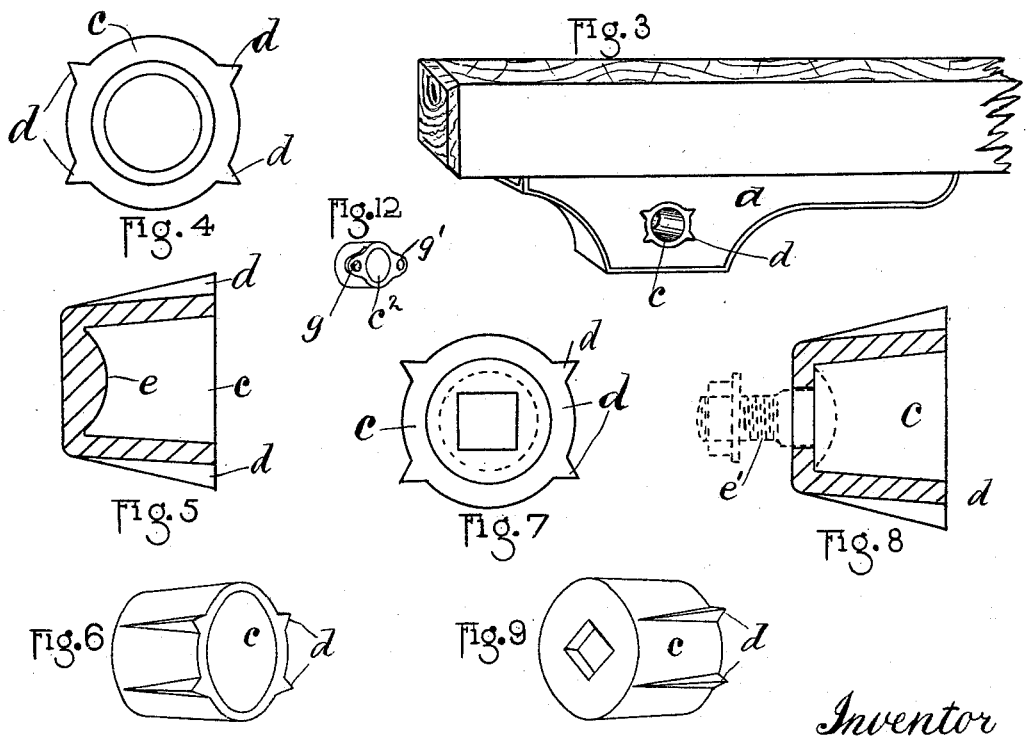
Witnesses.
A. J. Henson.
P. W. Pezzetti.
Inventor
Henry Houldsworth
per Wright Brown & Quinby
Attorneys.

UNITED STATES PATENT OFFICE.

HENRY HOULDSWORTH, OF KEIGHLEY, ENGLAND.

DETACHABLE BUSH FOR WHEELBARROW-AXLES.

SPECIFICATION forming part of Letters Patent No. 596,708, dated January 4, 1898.

Application filed July 6, 1897. Serial No. 643,533. (No model.)

*To all whom it may concern:*

Be it known that I, HENRY HOULDSWORTH, a subject of the Queen of Great Britain, residing at Ingrow Lane, Keighley, in the county of York, England, have invented a new and Improved Detachable Bush for the Axles of Wheelbarrows, of which the following is a specification.

In connection with the axles of wheelbarrows, particularly of the class wherein the bearings for said axles are formed of wood, yet to a certain extent also wherein the bearings are of metal, these said bearings deteriorate so quickly by the abrading actions of said axles as to be a source of considerable expense as well in the increased power required by the extra frictioning and cross-binding action thereby put upon the wheels as in the ultimate renewals thereof, so that to obviate these disadvantages by the production of means which may be readily applied either to new or to existing wheelbarrows is the object of this invention, and this object I attain by the device illustrated by the accompanying sheet of drawings, in which—

Figure 1 is a front elevation of a portion of a wheelbarrow with its axle mounted in bearings or bushes made in accordance with my invention. Fig. 2 is a similar view to Fig. 1, but illustrates a modification hereinafter explained. Fig. 3 is a perspective view of part of one side of a wheelbarrow and illustrates the position therein occupied by my improved bush. Figs. 4, 5, and 6 are front, longitudinal section, and perspective views, respectively, drawn to an enlarged scale, of one form of my improved bush. Figs. 7, 8, and 9 are similar views to Figs. 4, 5, and 6, respectively, but show another form in which my improved bush is produced. Figs. 10, 11, and 12 are respectively side, front, and perspective views, same scale as Figs. 1, 2, and 3, illustrating certain modifications hereinafter explained.

Similar letters of reference indicate similar parts throughout the several views.

In carrying my invention into effect in connection with the well-known wooden bearings $a$, forming part of the frame for supporting the axles $b$, I make a cup-shaped bush $c$, preferably of cylindrical form, so that it can be readily inserted into a hole bored in said wooden bearing $a$ by any of the common boring-tools, and on this bush $c$ I make one or more wings or fins $d$, (four of these are shown in each case,) which strike into or become embedded in the wood on the bush $c$ being driven into the hole bored to receive it.

On the end wall of the socket within the bush $c$ I form a protuberance or abutment $e$ for receiving the end thrust of the axle, so that whenever the axle $b$ is forced to the end of the bush it comes into contact with this protuberance $e$, which is of the shape shown, so as to afford as little resistance to the rotary motions of said axle $b$ as is possible, or this protuberance may be formed by the head of the retaining-bolt $e'$, Figs. 2, 7, 8, and 9.

When necessary or advisable, I form a projection $f$ on the end of the bush $c$ to fit into the hole made within the wooden bearing $a$, such projection $f$ being preferably considerably less in diameter than that of the bush $c$, so that the hole in the bearing $a$ is not required to be as large for this part, by which means the bush $c$ is held in position without the employment of other devices of any kind, while the lesser hole being made entirely through the bearing $a$ affords facilities for the insertion of a bar or other instrument for forcing or dislodging the bush $c$ whenever it is found necessary to have the same detached or replaced by a new one.

In forming the detachable bush $c'$ to fit metal bearings $a'$ (see Fig. 11) I may have it of hexagonal or other shape in cross-section, while the hole or opening in the metal bearing $a'$ is shaped to receive it, and when placed in position therein the bush $c'$ will be held from rotating.

Should it be thought desirable, extra fixing parts, as the ears $g$ $g'$, may be formed on the bush $c^2$, Fig. 12, so that screws may be passed therethrough and inserted into the wooden or other bearing on which such bush $c^2$ might be mounted. Thus this latter is thoroughly secured in position.

Such being the nature and object of my invention, what I claim is—

1. A bush for wheelbarrow-bearings comprising a metallic cup adapted to be driven longitudinally into the wood of the wheelbarrow-frame and having longitudinal fins formed on its external periphery, the said fins becoming embedded in the wood when the bush is driven into the frame and thereby preventing said bush from rotating.

2. A bush for wheelbarrow-bearings comprising a metallic cup having a socket to receive the wheel-axle and having a rounded abutment at the end of said socket adapted to receive the end thrust of the axle.

3. A bush for wheelbarrow-bearings comprising a metallic cup adapted to be driven into a recess in the wheelbarrow-frame, and a bolt for securing said bush to the frame, the said bolt passing through the end wall of the cup and having a head which constitutes an abutment to receive the end thrust of the wheel-axle.

HENRY HOULDSWORTH.

Witnesses:
SAMUEL ALY,
HARRY ELLISON.